Feb. 15, 1927.  
N. S. FOCHT  
1,617,752  
SHOCK ABSORBER  
Filed Dec. 24, 1925
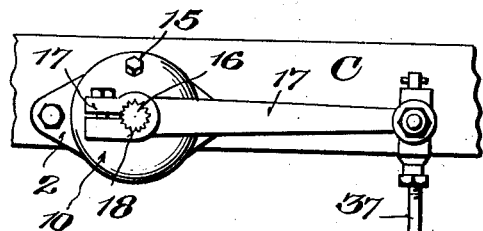
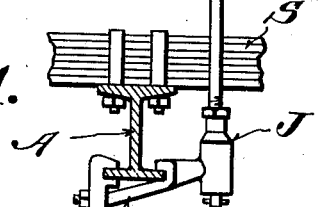
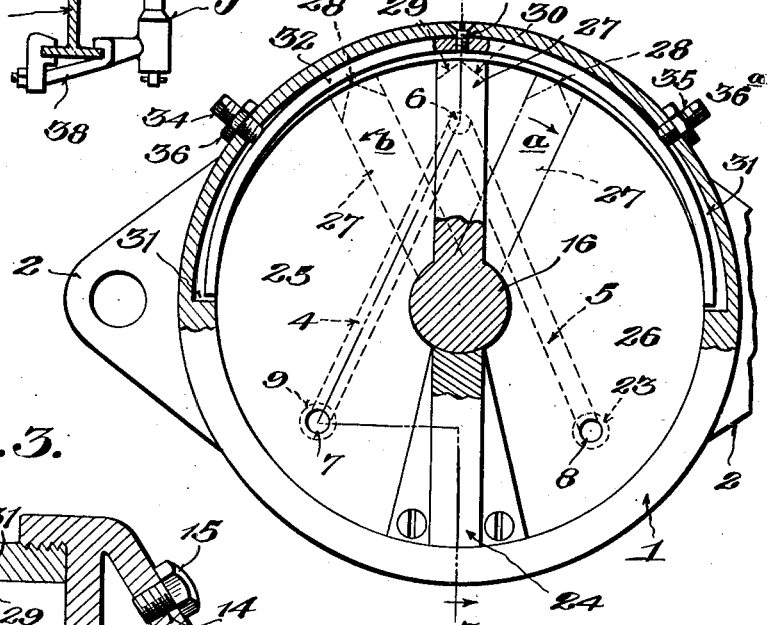
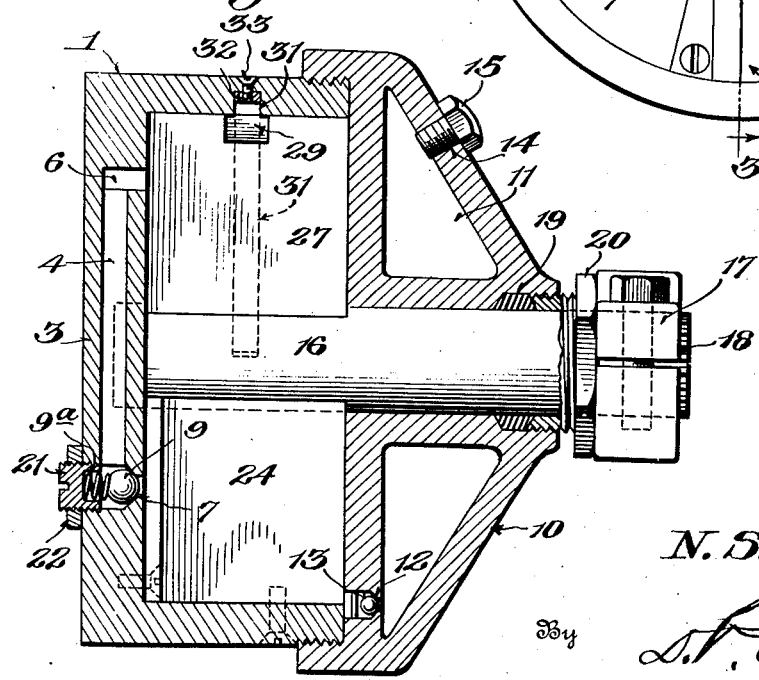
Inventor  
N. S. Focht, Patented Feb. 15, 1927.

1,617,752

UNITED STATES PATENT OFFICE.

NEVIN S. FOCHT, OF POTTSTOWN, PENNSYLVANIA.

SHOCK ABSORBER.

Application filed December 24, 1925. Serial No. 77,538.

This invention relates to vehicle shock absorbers of the type employed for preventing excessive shock of thrust and rebound.

A primary object of the invention is to provide means for application to a motor car whereby easy riding is assured by preventing abrupt or sudden rises or falls of the car body in travelling over either elevations or depressions in the road surface and by means of which the car chassis will at all times be maintained substantially the same distance from the normal line of the road surface regardless of irregularities in the road encountered by the car wheel.

Another object of the invention is to provide a shock absorber constructed to prevent too violent compression of the vehicle springs and the consequent jumping of the wheel from the road surface thereby reducing vibration; which checks proportionately on the rebound according to the extent of spring compression; which permits a wheel to drop freely into a rut and yet prevents dropping of the car chassis, and which offers little or no resistance to the action of the spring under moderate blows on the axle due to comparatively small inequalities in the roadway.

Another object of the invention is to construct a shock absorber of this character in which there are three adjustments all easily made from the outside and which control the three functions above described.

A further object is to provide a shock absorber which will not retard normal spring action and yet will momentarily interpose sufficient resistance to absorb the major portion of the shock when unusually violent spring compression occurs, and thereby prevents overcompression of the spring.

A still further object is to so construct such a shock absorber that it will check the rebound of the spring according to the extent of the spring compression or energy stored in the spring, and also interpose a resistance to the fall of the car chassis when the wheels drop into a rut, which is directly proportionate to the loss of energy of the spring during its over expansion and decreases to zero as the wheel rides out of the rut and the spring returns to normal load position. In that connection the invention also contemplates a shock absorber which is readily adjustable to meet the requirements of the spring in connection with which it is used; and which is simple in construction and easily applicable.

In carrying out these objects the invention is susceptible of a wide range of modifications without departing from the spirit or sacrificing any of the advantages of the claims of the invention; there being shown in the drawings for illustrative purposes and preferred and practical form, in which:

Figure 1 represents a side elevation of one form of the invention applied to an automobile frame and axle, fragments of which are shown.

Fig. 2 is a front elevation of the absorber with the cylinder head removed and parts shown in section; and Fig. 3 is a transverse section taken on the line 3—3 of Fig. 2.

Similar reference characters designate corresponding parts throughout the several figures of the drawings.

To accomplish the objects above set forth the invention embodies means for guiding and controlling the vehicle springs in their expansion and contraction while passing over rough surfaces, and means whereby such control will be smooth and positive in action which is accomplished by controlling the rebound, and offering a resistance which is proportional to the amount of energy stored in the springs, which energy is determined by the degree of spring compression.

The invention further recognizes that the means provided must assist the springs in supporting the weight of the car while the spring expands and allow the car wheel to drop into a depression in the road surface, and that the resistance must gradually decrease from the lowest point up to the normal position of the spring where the energy of the spring supports the car weight.

In carrying this invention into effect it is proposed to show as the preferred form of the invention a cylinder 1 equipped with radially extending apertured ears 2 for bolting to the chassis C of the car. This cylinder 1 is equipped with a removable head 10 shown threaded thereon and which is hollow to provide a liquid reservoir 11 for supplying oil to the cylinder through a valve controlled opening 12 in a manner presently to be more fully described. The opening 12 which communicates with the interior of the cylinder is shown provided with a check valve 13 in the form of a ball. The reservoir 11 is also provided with a filling opening 14 having a removable plug 15 mounted therein to provide for the replenishing of the oil reservoir when necessary.

A shaft 16 is rotatably mounted in the cylinder 1 and the top 10 thereof as is shown clearly in Fig. 3 and has its outer end fluted to receive a lever 17 the inner edge of which is split and clamped around said shaft, the fluted shaft end shown at 18 adapting the lever to assume different positions on the shaft in mounting. A suitable packing 19 surrounds the outer end of the shaft 16 and is held in position by a gland 20.

The cylinder 1, which is preferably made in the form of a casting, has the bottom or end 3 thereof channeled as shown at 4 and 5. These channels 4 and 5 diverge from their upper toward their lower ends and merge at their meeting ends in the opening or port 6 which discharges into the cylinder above the shaft 16 and at a point opposite the normal position of the piston blade 27 which closes said port when in such position. The lower ends of these channels or by-passes 4 and 5 open through the inner face of the cylinder bottom at 7 and 8 affording communication between the channels and the cylinder at these points. The opening 7 is equipped with a spring pressed check valve 9 the spring 9ª of which is seated in a hollow screwthreaded adjusting plug 21 held in adjusted position by a jam nut 22.

A ball valve 23 is mounted in the opening 8 and operates as a check valve to permit oil to pass out through the channel 5 into the cylinder and prevents its passing back into said channel. A radial partition 24 extends from the shaft 16 to the bottom of the cylinder and is secured by any suitable means. This partition is located between the valved openings 7 and 8 preferably at a point midway between them as is shown clearly in Fig. 2 and divides the cylinder into two compartments or chambers 25 and 26 which are to be filled with some suitable substantially non-compressible fluid such as oil, glycerine or the like.

Fixed to the shaft 16 within the cylinder 1 is the piston vane or blade 27 which snugly fits in the cylinder above shaft 16 and in connection with the fixed partition 24 completes the division of the cylinder into the compartments 25 and 26.

This piston blade or vane 27 is of the radial, oscillating or swinging type with the center of oscillation at the center of the cylinder and formed by the shaft 16. Its swinging edge 28 cooperates with the inside wall of the cylinder and when in normal position under static load and alined with the partition 24 as shown in Fig. 2, the port 6 is arranged directly opposite this vane and closed thereby thus preventing any by-pass action of passages 4 and 5. It will thus be seen that the fixed and movable wings or vanes 24 and 27 divide the cylinder into the compartments or chambers 25 and 26 the volume of which is variable and is controlled by the movement of vane 27 which constitutes the piston blade.

This oscillating or rotating piston blade 27 is provided at its swinging edge 28 with recesses 29 and 30 located on opposite faces thereof and designed to register with a groove 31 formed in the inner face of the cylinder wall and extend circumferentially substantially throughout one half of the cylinder above the shaft 16. Mounted in this groove 31 is what may be termed a checking member made in the form of a spring metal flexing ring 32 which is secured midway its length to the cylinder wall as shown at 33 with its ends free to move into and out of the groove for purposes presently to be described. These ends are adjustable by means of set screws 34 and 35 operating through the wall of the cylinder and bearing against the ends of the ring as is shown clearly in Fig. 2 and which are held in adjusted position by jam nuts 36 and 36ª. This adjustment of the ends of the flexing ring is designed to vary the depth of the groove, which groove gradually increases in depth from the ends of the ring towards its point of connection with the cylinder at 33, and the size of said groove is varied according to the position of the piston blade 27 for the purpose of affording proportionate resistance as will be more fully described hereinafter.

The absorber constituting this invention is designed to be mounted on a part of the vehicle frame or chassis shown at C and connected with the axle A and vehicle spring S. This connection is effected by means of the lever 17 pivotally connected at its outer end with a drag link 37 the lower end of which is secured to the axle A by means of a clamp 38, having a ball and socket connection with the link.

In the operation of the invention the parts being in the position shown in the drawings with the reservoir 11 and chambers 25 and 26 filled with a suitable liquid, compression of the vehicle spring S will cause the piston 27 to move in counter-clock-wise direction as shown by the arrow b thereby exerting pressure on the oil in the chamber 25 and causing it to by-pass out through the valved opening 7 and to flow through the channel 4 back into the cylinder through the port 6 which when the piston is in the position shown by the dotted lines at the left of Fig. 2 discharges into the compartment 26. On the return of the piston 27 to normal or full line position shown in Fig. 2 or on the rebound, the valve 9 closes port 7 and the oil by-passes around the groove 31 which is its only means of escape into chamber 26 from chamber 25. This groove 31 varies in size according to the position of the piston thus giving a proportional resistance, and the semi-circular spring 32 is adjustable to adapt it for use with springs of different strength.

When the reverse movement of the piston takes place, incident to the expansion of spring S, that is when the piston moves in the direction of the arrow *a* in clock-wise direction pressure will be exerted on the liquid in chamber 26 and it will be forced out through port 8 and the by-pass 5 through opening 6 into the compartment 25.

It will be seen that the groove 31 increases gradually in cross-section during the movement of the piston to initial position and thereby permitting the piston to move quickly as it approaches its neutral position, and consequently a smooth positive action is assured. It is also to be noted that oil from the reservoir 11 only enters the cylinder 1 on the clock-wise movement of the lever 17 which creates a vacuum in chamber 25 and thus causes the ball 13 to unseat. This ball valve opening into the chamber 25 does not alter or interfere with any of its functions.

It is also to be noted that by changing the tension of the spring 9a of the ball valve 9 any constant steadying resistance to violent oscillations of the car spring F can be obtained. This valve as above pointed out controls the flow of oil on the compression of the car spring and the travel of the piston 27 in counter-clock-wise direction from normal.

It will also be observed that by adjusting the set screws 34 and 35 the ring 32 is moved in or out thereby changing the extent of variation of the groove 31 through a certain period of piston travel.

The semi-cylindrical flexing ring 32 constitutes a distinctive feature of the invention, and as pointed out above provides for the proportional checking of the rebound according to the extent of the spring compression; that is when the spring S is compressed the lever 17 is actuated to move upward and thereby swing the piston blade 27 in the direction of arrow *b* which forces the liquid in chamber 25 out through the valved opening 9. As the blade 27 thus moves the depth of groove 31 gradually decreases thereby increasing the resistance to such blade movement. The adjustment of bolt 34 controls the position of spring end at the left of its point of attachment 33 and thus varies the depth of groove 31 to cause greater or less resistance to be offered to the movement of blade 27 in both of its movements. The return of blade 27 to normal position operates as above pointed out, that is the resistance to its movement gradually decreases permitting it to move more rapidly.

I claim:

1. A shock absorber comprising a member for connection with the vehicle body, a second member for connection with the axle and movable relatively to the first, and means for checking proportionately on the rebound acording to the extent of compression of the vehicle spring.

2. A shock absorber comprising a member for connection with a vehicle body, a second member for connection with the axle and movable relatively to the first, a resistance medium to oppose said relative movement, means cooperating with said medium to offer slight resistance to the vehicle spring under moderate blows, means for preventing violent compression of the vehicle spring and thereby reducing vibration, and means for checking proportionately on the rebound according to the extent of the spring compression.

3. A shock absorber including a hollow circular body having a groove in its side wall and also provided with passages uniting at a common outlet port and having spaced intake ports, fixed and movable vane members normally disposed in diametrically opposite relation within the hollow body whereby the movable vane normally covers said outlet port, and means for throttling said groove.

4. A shock absorber including a hollow circular body having a groove in its side wall and also provided with passages uniting at a common outlet port and having spaced intake ports, valves at the intake ports, fixed and movable vane members, the movable vane normally covering said outlet port, and adjustable means for throttling said groove.

5. A shock absorber including a hollow circular body having a groove in its side wall and also provided with passages uniting at a common outlet port and having spaced intake ports, fixed and movable vane members normally disposed in diametrically opposite relation within the hollow body whereby the movable vane normally covers said outlet port, and adjustable means for progressively making said groove shallower remote from the normal position of the movable vane.

6. A shock absorber including a hollow circular body having a groove in its side wall and also provided with passages uniting at a common outlet port and having spaced intake ports, fixed and movable vane members normally disposed in diametrically opposite relation within the hollow body whereby the movable vane normally covers said outlet port, a flat spring member arranged in said groove and anchored to the bottom thereof intermediate its ends whereby the ends are free, and means for adjusting the ends of the spring in said groove.

7. A shock absorber including a circular hollow body having a circumferentially disposed groove in its inner side wall, fixed and movable vanes for dividing said hollow body into opposite chambers, said chambers normally communicating with each other through said groove, valved passage ways in the body having ports normally communicating with the chambers at opposite sides of the vanes and also having another port adapted to be controlled by the movable vane, an arcuate spring member held at its medial portion within said groove, and means for moving the ends of said spring in the groove to progressively decrease the depth thereof away from the medial portion.

8. A shock absorber including a circular hollow body having by-passes therein, fixed and movable vanes for dividing said body into chambers, said chambers normally communicating with each other through said by-passes, said movable vane operating to vary the size of said by-passes on the working stroke thereof.

9. A shock absorber including a circular hollow body having a groove in its inner side wall, means for throttling said groove, a cover for said body, a fixed vane member in said body, a movable vane journaled in said cover and cooperating with the fixed vane to provide opposite fluid chambers, a discharge valve for each chamber located to one side of the axis of the movable vane, a feed port in the body on the opposite side of the axis of the vane and connected by separate passages to the discharge valve, the movable vane acting to cover and uncover the inlet port to alternately connect it with the separate chambers.

10. A shock absorber including a circular hollow body having a circumferentially disposed groove in its inner side wall, said groove extending substantially across the upper part of the circumference of said wall, an arcuate spring held at its medial portion to approximately the middle of said groove, means for flexing the ends of said spring in said groove to vary the depth thereof, and a movable vane normally positioned opposite the medial portion of the spring and adapted to encounter increased fluid resistance as it swings to one side or the other of said position due to the flexing of the ends of the spring.

11. A shock absorber including a circular hollow body having a groove in its inner side wall, means for throttling said groove, a cover for the body, a fixed radial abutment in said hollow body, a movable vane journaled in said cover extending into the hollow body to be disposed normally in diametrical alinement with the fixed abutment to provide opposite fluid housing chambers, a discharge valve for each chamber and both of said valves being located at the same side of the axis of the movable vane, a feed port on the side of the axis of the vane opposite the discharge valves and connected therewith by separate passages, the vane adapted to cover and uncover the inlet port to alternately connect it with the separate chambers.

In testimony whereof I hereunto affix my signature.

.NEVIN S. FOCHT.